United States Patent
Adil et al.

(10) Patent No.: US 10,116,731 B2
(45) Date of Patent: Oct. 30, 2018

(54) METHOD AND SYSTEMS FOR PROVIDING DATA TO A REMOTE SITE

(71) Applicants: Zahir Adil, Billerica, MA (US); Richard Pineau, Andover, MA (US); Adam Pineau, Haverhill, MA (US)

(72) Inventors: Zahir Adil, Billerica, MA (US); Richard Pineau, Andover, MA (US); Adam Pineau, Haverhill, MA (US)

(73) Assignee: ONCAM GLOBAL, INC., Billerica, MA (US)

( * ) Notice: Subject to any disclaimer, the term of this patent is extended or adjusted under 35 U.S.C. 154(b) by 339 days.

(21) Appl. No.: 14/208,723

(22) Filed: Mar. 13, 2014

(65) Prior Publication Data

US 2015/0264114 A1    Sep. 17, 2015

(51) Int. Cl.
*G06F 15/16* (2006.01)
*H04L 29/08* (2006.01)
*H04L 12/24* (2006.01)
*H04L 29/06* (2006.01)

(52) U.S. Cl.
CPC .......... *H04L 67/10* (2013.01); *H04L 41/0803* (2013.01); *H04L 63/1441* (2013.01)

(58) Field of Classification Search
USPC ........................................................ 709/227
See application file for complete search history.

(56) References Cited

U.S. PATENT DOCUMENTS 6,182,116 B1 *  1/2001  Namma ............ G06F 17/30899
                                                       348/E5.008
6,754,709 B1     6/2004  Gbadegesin
7,069,434 B1     6/2006  Ilnicki et al.
(Continued)

FOREIGN PATENT DOCUMENTS

EP    1773021 A1    4/2007
EP    2648397 A1    10/2013

OTHER PUBLICATIONS

Devadithya et al. "The Common Instrument Middleware Architecture: Overview of Goals and Implementation." Indiana University Computer Science Technical Report No. TR616. E-Science and Grid Computing, First International Conference, Pittsburgh, PA. Dec. 5, 2005.

*Primary Examiner* — Alicia Baturay
(74) *Attorney, Agent, or Firm* — Burns & Levinson LLP; Orlando Lopez

(57) ABSTRACT

A system including a first server, a second server operatively connected over a network to the first server and a gateway component operatively connected over the network to the first server and the second server. The first server is configured to receive a request for data, the request for data specifying the gateway component and including a predetermined port number at the second server, and send the request for data to the gateway component. The second server is configured to receive the data at the predetermined port number, the data being provided by the gateway component. The gateway component is configured to receive the request for data, retrieve the data from a data source, operatively connect, over the network, to a port at the second server, the port corresponding to the predetermined port number, and send the data to the second server. Methods for using the system are also disclosed.

20 Claims, 8 Drawing Sheets

(56) References Cited

U.S. PATENT DOCUMENTS

| | | | | |
|---|---|---|---|---|
| 7,209,977 B2* | 4/2007 | Acharya | H04L 29/12009 | 370/395.3 |
| 7,333,431 B2* | 2/2008 | Wen | H04L 12/5602 | 370/230.1 |
| 7,962,620 B2* | 6/2011 | Safari | G06F 11/1433 | 709/223 |
| 8,000,465 B2 | 8/2011 | Williams et al. | | |
| 8,041,814 B2* | 10/2011 | Chase | H04L 29/06 | 709/225 |
| 8,171,139 B2* | 5/2012 | Chase | H04L 29/06 | 709/203 |
| 8,185,056 B2* | 5/2012 | Kotabe | H04L 12/2697 | 455/67.11 |
| 8,266,327 B2* | 9/2012 | Kumar | H04L 63/08 | 709/223 |
| 8,578,287 B2* | 11/2013 | De Los Reyes | G06F 3/023 | 715/771 |
| 8,635,300 B2* | 1/2014 | Kvache | H04L 12/2809 | 709/217 |
| 8,700,892 B2* | 4/2014 | Bollay | H04L 63/166 | 713/153 |
| 8,732,091 B1* | 5/2014 | Abhyanker | H04L 63/08 | 705/1.1 |
| 8,875,135 B2* | 10/2014 | Ma | G06F 9/5038 | 718/100 |
| 8,886,758 B2* | 11/2014 | Safari | H04L 41/00 | 707/781 |
| 8,963,916 B2* | 2/2015 | Reitan | G06F 3/011 | 345/419 |
| 9,069,588 B2* | 6/2015 | Safari | G06F 11/1433 | |
| 9,178,706 B1* | 11/2015 | Bollay | H04L 63/166 | |
| 9,274,595 B2* | 3/2016 | Reitan | G06F 3/011 | |
| 9,417,895 B2* | 8/2016 | Safari | G06F 11/1433 | |
| 2002/0099829 A1* | 7/2002 | Richards | G06F 17/30899 | 709/227 |
| 2003/0039212 A1* | 2/2003 | Lloyd | H04L 41/0823 | 370/235 |
| 2003/0079019 A1* | 4/2003 | Lolayekar | H04L 67/1097 | 709/226 |
| 2006/0064478 A1* | 3/2006 | Sirkin | H04L 29/12066 | 709/223 |
| 2006/0230119 A1* | 10/2006 | Hausauer | H04L 47/6265 | 709/216 |
| 2007/0165672 A1* | 7/2007 | Keels | H04L 1/0061 | 370/474 |
| 2007/0208820 A1* | 9/2007 | Makhervaks | H04L 69/166 | 709/212 |
| 2007/0274314 A1* | 11/2007 | Werber | H04L 12/5695 | 370/392 |
| 2008/0043750 A1* | 2/2008 | Keels | H04L 49/9094 | 370/395.52 |
| 2014/0059191 A1* | 2/2014 | Calo | H04L 47/122 | 709/221 |

* cited by examiner

METHOD AND SYSTEMS FOR PROVIDING DATA TO A REMOTE SITE

BACKGROUND

These teachings relate generally to providing data to a remote site, and, more particularly, to methods and systems of using a gateway to provide data to a remote site.

Communications over the internet require a data transfer between two machines. A local machine requests a connection on a specified port number on the remote machine. A dynamically allocated port on the local machine then connects to the specified port on the remote machine, and the communication can proceed.

The communication itself may be TCP based, where two machines are specifically connected over a dedicated channel (such as in a telephone call), or it could be a UDP transfer, where one machine sends data and is not aware if or when the other machine receives it (analogous to the postal service). Either of these methods make the use of what are called "ports" via which the data transfer is made on a single shared physical network line.

On the local end, typically, the machine will connect via a router. This router performs multiple functions, but one function can be to protect the internal local network from network snoopers and hackers. It does this by selectively opening or closing ports that are accessible from the outside world into the local network.

A hacker can make use of an open port to gain access to a machine within the local network. If however, a router is set up so that it does not allow incoming requests to some port numbers, the hacker will be unable to gain access. Such an arrangement is called as a connection via a firewall.

For this reason, it is desirable that as few incoming ports as minimally required are allowed into the local network. On the other hand outgoing ports are safe, since the data that is being transferred is initiated from the local end and is being sent out.

On the remote side, sophisticated security solutions can be used to make lessen the impact of unauthorized access into the system, making use of more sophisticated firewalls and heuristic rules to determine if a requested access is legitimate or not. This level of equipment installation is impractical for home owners or small business owners to use on the local end.

If a data source, for example, a camera, is placed at a local site, it would be desirable to be able to watch the output of the data source, for example, video from the camera, from a remote site. Typically, a port would need to be opened on the local firewall, which would then allow a remote monitoring request to be passed to the data source, and the output from the data source be retrieved from it. This introduces an insecurity, that is, opening a local port on the firewall/router.

There is a need for methods and systems for providing data to a remote site that do not require opening a local port on the firewall/router.

BRIEF SUMMARY

Methods and systems for providing data to a remote site that do not require opening a local port on the firewall/router are presented herein below.

In one or more embodiments, the system of these teachings includes a first server, a second server operatively connected over a network to the first server and a gateway component operatively connected over the network to the first server and the second server. The first server is configured to receive a request for data, the request for data specifying the gateway component and including a predetermined port number at the second server, and send the request for data to the gateway component. The second server is configured to receive the data at the predetermined port number, the data being provided by the gateway component. The gateway component, in these embodiments, is configured to receive the request for data, retrieve the data from a data source, operatively connect, over the network, to a port at the second server, the port corresponding to the predetermined port number, and send the data to the second server.

In one or more instances, the second server is also configured to receive the request for data from a remote site, send to the first server the request for data and send, after receiving the data, the data to the remote site.

The method of these teachings, in one or more embodiments, can be described from a first server centric point of view, a second server centric point of view or a gateway center point of view.

In one or more embodiments, from a first server centric point of view, the method of these teachings, shown in FIG. 6, includes receiving at a first server a request for data (step 160, FIG. 6), the request for data specifying a gateway, the gateway being operatively connected over a network to the first server, the request for data comprising a predetermined port number at a second server, and sending, from the first server, the request for data to the gateway (step 165, FIG. 6), wherein the data is retrieved by the gateway and provided, over the network, to the second server at the predetermined port number.

In one or more embodiments, from a second server centric point of view, the method of these teachings includes sending, from a second server, to a first server, a request for data, the request for data specifying a gateway, the gateway being operatively connected over a network to the first server, the request for data including a predetermined port number at the second server, wherein the first server sends the request for data to the gateway and wherein the data is retrieved by the gateway, and receiving, at the second server and over the network, the data at the predetermined port number; the data being provided by the gateway.

In one or more embodiments, from a gateway centric point of view, the method of these teachings includes operatively connecting a gateway, over a network, to a first server, receiving, at the gateway, the request for data, the request for data including a predetermined port number at a second server, retrieving, at the gateway, the data from a data source, operatively connecting the gateway, over the network, to a port at the second server; the port corresponding to the predetermined port number, and sending, from the gateway, the data to the second server.

A number of other embodiments are also disclosed including embodiments for computer program products.

For a better understanding of the present teachings, together with other and further objects thereof, reference is made to the accompanying drawings and detailed description and its scope will be pointed out in the appended claims.

DETAILED DESCRIPTION

Methods and systems for providing data to a remote site that do not require opening a local port on the firewall/router are presented herein below.

The following detailed description presents the currently contemplated modes of carrying out the invention. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

A "Gateway" or "gateway component," as used herein, is a communications device that interconnects a local site to a network. The gateway can connect, through the network, the local site to other components.

"Data block," as used here in, is a block of data that is transferred from the local site to another component. One Exemplary embodiment of a data block is a frame in a video stream.

In one or more embodiments, the system of these teachings includes a first server, a second server operatively connected over a network to the first server and a gateway component operatively connected over the network to the first server and the second server. The first server is configured to receive a request for data, the request for data specifying the gateway component and including a predetermined port number at the second server, and send the request for data to the gateway component. The second server is configured to receive the data at the predetermined port number, the data being provided by the gateway component. The gateway component, in these embodiments, is configured to receive the request for data, retrieve the data from a data source, operatively connect, over the network, to a port at the second server, the port corresponding to the predetermined port number, and send the data to the second server.

In one instance, the request for data originates at a remote site. In some instances, the request for data is provided from the remote site to the second server and from the second server to the first server.

Figure 1:
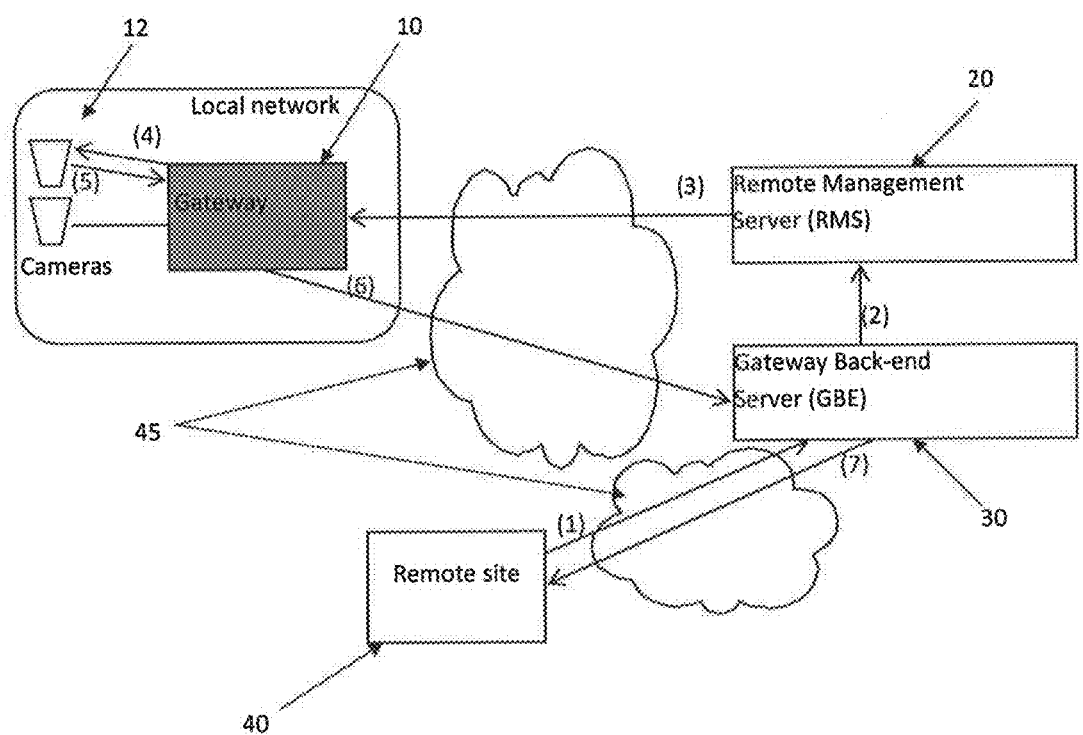
FIG. 1 is a schematic block diagram representation of one embodiment of the system of these teachings.

FIG. 1 shows an embodiment of the system of these teachings. Referring to FIG. 1, in the embodiment shown there in, a gateway 10 (also referred to as a gateway component): next a local site 12, through a network 45, to a first server 20 (also referred to as a Remote Management System (RMS)) and to a second server 30 (also referred to as a Gateway Back-end (GBE) server). A remote site 40 is connected through the network to the second server 30.

In order to further elucidate the present teachings, at exemplary embodiment in which a request for a video stream, from a camera installed at the local site 12, is initiated from the remote site 40 is presented below. It should be noted that these teachings are not limited to only that exemplary embodiment. For example, other embodiments can include, but are not limited to, a preprogrammed request for data, originating at the first server 20.

Although in the exemplary embodiment, one or more cameras are installed at the local site, providing a video stream, other examples, these teachings not being limited to only those examples, of devices, installed at the local site 12, that can be accessed from the Gateway include:

1. Binary switches providing an On|Off functionality.
2. Multi-level switches providing a series of levels between which they can be set. An example is a light dimmer.
3. Binary sensors such as motion detectors, door sensors, etc.
4. Thermostat controls.
5. Access control devices such as authenticated door entry.
6. Sirens|Chimes|Voice Output Device
7. stepper motor controllers, PWM speed controllers etc.

On power-up, the gateway 10 connects to a Remote Management System (RMS) 20 and keeps this connection open for as long as the gateway 10 remains powered on. This connection is then used to send various requests to the gateway. One such request is to start a stream from a locally installed camera. This request can be made in response of a remote video monitoring display.

When a remote site makes a request for a video stream, the following steps are followed:

1. The remote site makes a connection (1) to a web server, referred to as the Gateway Back-end (GBE) 30
2. GBE 30 makes a request to the RMS 20 (2) for a video stream from a certain gateway and camera, and a specific port number for the gateway to "back-connect" on.
3. The RSM formats and sends the request to the gateway over the always open gateway<->RMS connection (3). The gateway 10 receives the request from the RMS 20.
4. The gateway 10 sends a video request (4) and retrieves video data (5) from the specified camera.
5. The gateway then opens a connection with the GBE setting (6) on the port number that was specified via the RMS 20, and keeps this connection open for video data transfer.
6. The gateway then pushes the camera's video data to the GBE 30 via the video data connection (6).
7. The GBE 30 sends this video data back to the requesting remote monitoring site 40 (7).

Although the exemplary embodiment relates to retrieving video data, other exemplary embodiments could include retrieving data from any of the other devices accessible from the Gateway. In other exemplary embodiments, instead of retrieving data the Gateway can initiate and retrieve data from a macro such as, for example, but not limited to, "If Sensor-A is activated, start the stream from Camera-B and turn on Light-A, Light-B;" or "If Sensor-B is activated, sound a chime and Announce Message-C on VoiceDevice-A."

In one embodiment, the second server includes a data rate measuring subsystem and is also configured to send, over the network, an initiation signal to the gateway component in order to initiate a data rate measuring test to measure data rates between the second server and the gateway component. In that embodiment, the gateway component is also configured to, after initiation of the data rate measure test, provide test data to the second server and the second server is further configured to determine, using the data rate measuring component, a data rate between the second server and the gateway component and to provide the data rate to the gateway component. The gateway component is further configured to calculate a data block size in order to ensure substantially a predetermined data block rate. Although any conventional data rate measuring subsystem can be used, for illustration purposes, although not a limitation of these teachings, the data rate measuring subsystem can include a time measurement component (such as a subsystem including, if an initiation signal or indicator precedes the test data and a completion signal or indicator is generated after receiving the test data, a timing component that detects the time between the initiation signal and the completion signal; a component that detects a number of bits or bytes into data and a component that determines the data rate from the number of bits and the time.

Figure 2:
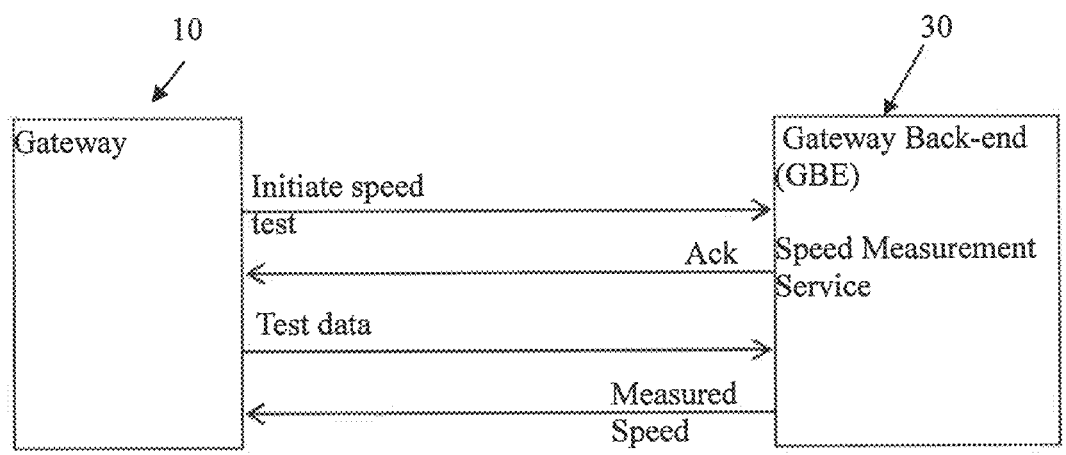
FIG. 2 is a schematic partial block diagram representation of another embodiment of the system of these teachings.

FIG. 2 illustrates the interaction between the gateway component 10 and the second server 30 during a data rate measurement. In order to better illustrate these teachings, an exemplary embodiment is presented herein below for the instance in which the data block is a frame from a video camera (or one picture from a still camera). It should be noted that these teachings are not limited to only that embodiment.

In the exemplary embodiment, the gateway component 10 connects to various cameras in response to a video stream request. The gateway 10 will, in turn, send the video data to an external receiver. It is desirable that a fairly constant frame rate (frames per second, fps) be maintained within the camera->gateway->second server (GBE) pipeline.

Each camera that the gateway will connect with will have one or more frame sizes available. For example, in the A camera, for the full frame, there are three different frame sizes to choose from. They are a 640×480, 1 megapixel and a 4 megapixel image size. Each succeeding frame size is significantly larger than the previous one. The larger frame sizes also mean that more data will be transferred per frame. More data allows more precise examination of the images, reducing the chances of errors in face/pattern recognition etc. Also, it is desirable that a fairly constant frame rate, of say, 3 fps is maintained.

Different installations of the gateway will have different levels of network (in one instance, Internet) data speeds available. The upload speed is the critical one for proper maintenance of frame rates at a given frame size. In the United States, a domestic cable connection allows upload speeds of the order of 2 to 2.5 million bits per second (mbps). Data speeds in Europe are lower, and still lower in Asia.

To account for the differences in upload data speeds, the gateway 10 will dynamically measure the data rate that it can maintain with the second server 30 (back end (GBE)). The gateway 10 will then throttle the frame size from a pre-defined table, in order to maintain a target frame rate of approximately 3 fps.

For the exemplary A camera, (24 bits per pixel)

| Frame size | Typical expected JPEG image size | Size in bits |
|---|---|---|
| 320 × 240 | 12 kilobytes | ~=100 kilobits |
| 640 × 480 | 35 kB | 280 kb |
| 1 MP (1024 × 1024) | 80 kB | 640 kb |
| 4 MP (2144 × 1944) | 200 kB | 1600 kb |

To ascertain the upload data rate, it is necessary that the exact path be measured, as that along which image data will be sent. To do this, a Speed Measurement Server will be developed on the second server 30 (Gateway Back-end (GBE)). Since images will be sent later to the same GBE machine, it ensures that the data bandwidth will be the same for images as it will be for the measurement.

Once the speed is available, the frame data size is calculated for an approximately 3 fps frame rate (frame size)*3=required data throughput per second.

For example, consider a measured data speed of 1 Megabits/second~=1000 kilobits/second.

From the pre-defined table above, the number of frames per second in each size that can be transferred over this connection can be calculated.

| | | |
|---|---|---|
| | 320 × 240 | 10 fps |
| | 640 × 480 | 3.6 fps |
| | 1 MP | 1.5 fps |
| | 4 MP | 0.6 fps |

The frame size which results in a lower throughput than the measured speed, or one that is closest, is automatically chosen as the default frame size. In this case, the 640×480 image will be able to maintain a frame rate of close to 3 fps, and will be chosen as the default frame rate. This default can be overridden by sending specific parameters to the gateway at the expense of frame rate.

It should be noted that the above exemplary embodiment is not a limitation of these teachings.

In another instance, the first server 20 is also configured to provide, to the gateway component 10, configuration data in order to modify or update configuration of the gateway component. In a further instance, the first server 20 is also configured to provide to the gateway instructions to start or stop operations of a component. In yet another instance, the first server 20 is also configured to receive, from the gateway 10, component data characterizing a component operatively connected to the gateway component and obtain a virtual representation of that component, the virtual representation comprising a virtual control interface, the virtual control interface enabling providing commands/instructions to that component. In that yet another instance, the first server 20 is further configured to provide commands/instructions to the component operatively connected to the gateway component.

Figure 3:
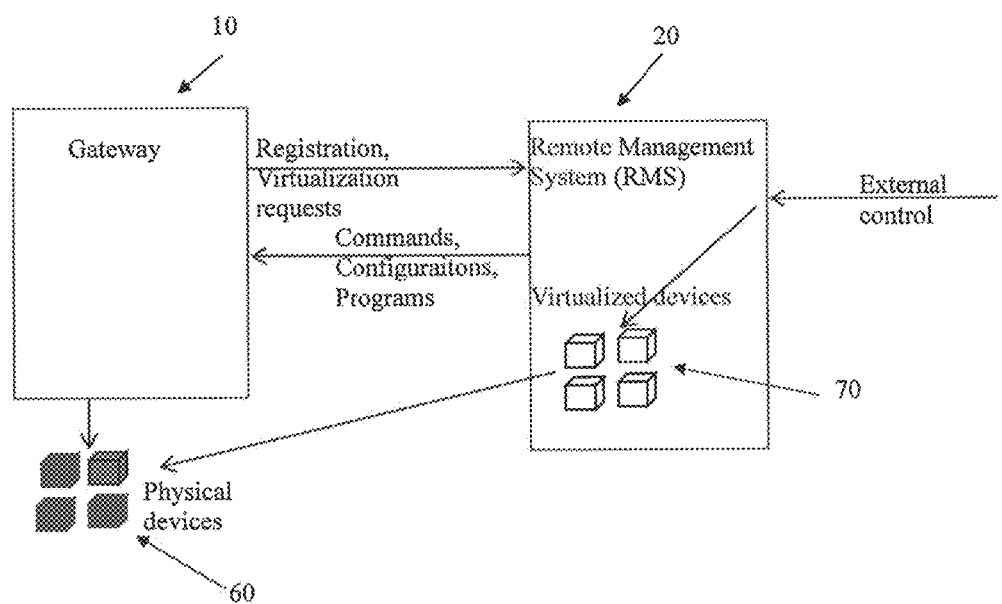
FIG. 3 is a schematic partial block diagram representation of yet another embodiment of the system of these teachings.

FIG. 3 shows the gateway connection to the first server during virtualization of components.

In one embodiment, when the gateway 10 is powered up, it makes a network (in one instance, TCP Internet) connection with the first server 20 (Remote Management System (RMS)). After the Gateway 10 identifies itself with the first server 20, a permanent record is made in the RMS database. The network connection that the gateway 10 made with the RMS 20 is kept active for as long as the gateway 10 is powered on. Communications are then possible between these two devices via the network 45.

In one instance, the gateway maintains a number of files, programs, configuration data etc. It is possible to use the open connection between the gateway 10 and the RMS 20 to transfer files to the gateway 10, to modify configuration data on the gateway, and to start or stop programs on it.

Files can be given a version number before transfer. If this is used, then the RMS 20 will maintain different versions of the files/programs. This allows a recovery option in case a file upload makes the gateway 10 unstable in operation.

In one embodiment, the gateway 10 will connect with different devices 60 such as, but not limited to, cameras. Using the RMS 20, each of these devices can be virtualized on the RMS 20 (virtualized devices 70, FIG. 3). Once virtualized, a defined control interface is available on the RMS 20. Modifying this virtualized interface, results in commands and data being transferred to the gateway, which in turn physically carries out the required commands/actions on the actual camera. Thus an exposed interface can be remotely used to control, for example, the camera. Actions can be to turn the device, for example, the camera, on/off, to move the lens, etc.

This virtualization is not limited to cameras, but can be used for any device, such as motion sensors etc. Also, a device need not be a physical device but can be implemented all in software, and a virtualized interface can be created on the RMS to carry out various actions on it.

In an exemplary embodiment, similar to the manner in which the virtualized devices are accessed via a control interface, the logic programs, also referred to as firmware, or some configuration data on the devices 60 that are accessible via the gateway can be updated. In this exemplary embodiment, the required firmware or data file can be transferred to the gateway 10 from the RMS 20 with a corresponding command regarding what is to be done with that transferred data.

In a detailed exemplary embodiment, for example, but not limited to, when the device 60 is a camera, the firmware can be transferred to the gateway, with a corresponding command to UPDATE the firmware on one or more of the cameras 60 that are attached and accessible via the gateway 10. The gateway can then read the file and issue the correct sequence of commands to the camera in order to update the firmware on the camera. After the update, the gateway can take the necessary steps to make that firmware active. This could be as simple as a camera re-boot or a more complex sequence of commands.

In another instance, a buffer of images is maintained at the gateway, and if needed, this buffer of images would be downloaded to an external site for analysis, thereby providing an alternative to continuous recording of the video stream at an external recorder.

In another embodiment, the gateway has several sensors, such as motion sensors, temperature sensors etc., attached to the Gateway. In one instance off-site recording of video or images (not pre-buffer) is initiated upon receiving a trigger from one of these sensors.

The above instance and embodiment can be combined in order to reduce the unavailability of data for analysis, resulting in the following embodiment of the method of these teachings:

1. Cameras are not continually recorded off-site.
2. A pre-buffer for each camera is locally held in the gateway.
3. On an event, external recording is triggered.
4. Pre-buffered images are transferred to external site.
5. These pre-buffered images plus the event-based recordings are used in analysis.

Figure 4:
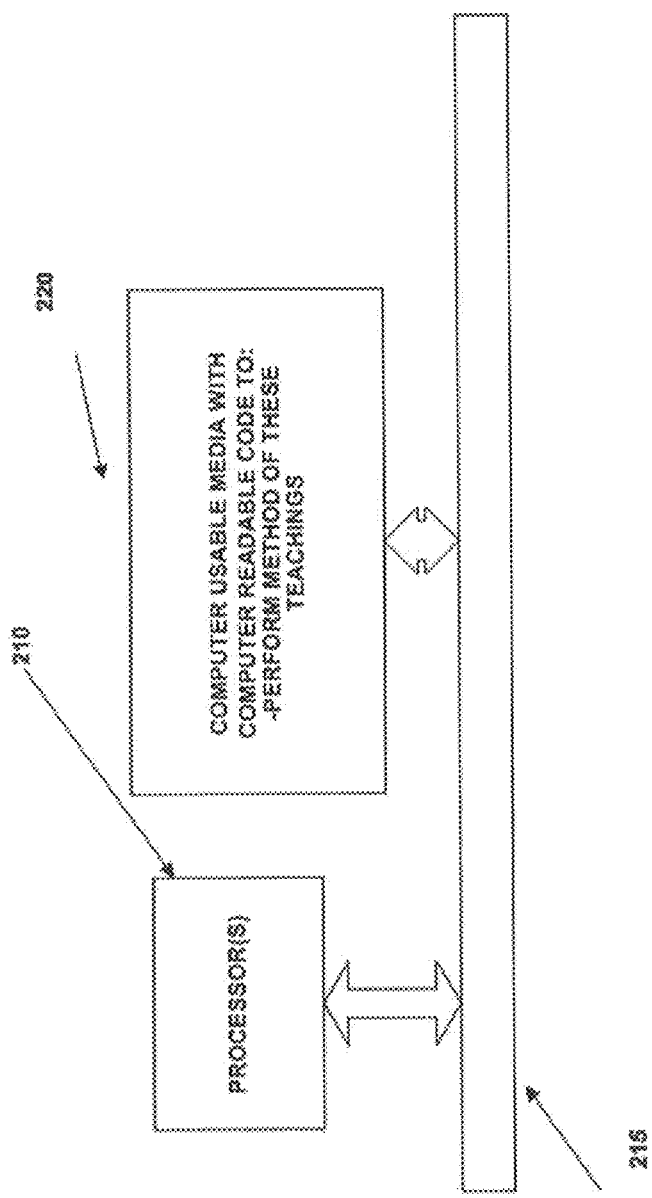
FIG. 4 is a schematic block diagram representation of a component of an embodiment of the system of these teachings.

In one embodiment, the first server 20 and/or the second server 30 and/or the gateway component 10 can include one or more processors and computer usable media, where the computer usable media has computer readable code embodied therein that, when executed in the one or more processors, causes the one or more processors to perform the functions that the first server 20 or the second server 30 or the gateway component 10 are configured for. Such an embodiment is shown in FIG. 4. Referring to FIG. 4, in the embodiment shown therein, one or more processors 210 are operatively connected (by means of connection component 215) to computer usable media 220, which has computer readable code embodied therein, that, when executed in the one or more processors, causes the one or more processors to perform the functions that the first server 20 or the second server 30 or the gateway component 10 are configured for.

In one exemplary embodiment, not a limitation of these teachings, the gateway is a Linux based Plug Computer. Linux is the kernel which allows software to be written targeting the plug computer. In the exemplary embodiment, the gateway runs a framework that is an OSGi (a Java based technology specified by the OSGi Foundation).

It should be noted that, in other embodiments, the functions and operations that the first server 20 or the second server 30 or the gateway component 10 are configured for can be implemented using special purpose circuitry, with or without software instructions, such as using Application-Specific Integrated Circuit (ASIC) or Field-Programmable Gate Array (FPGA), which may be programmable, partly programmable or hard wired.

Figure 5:
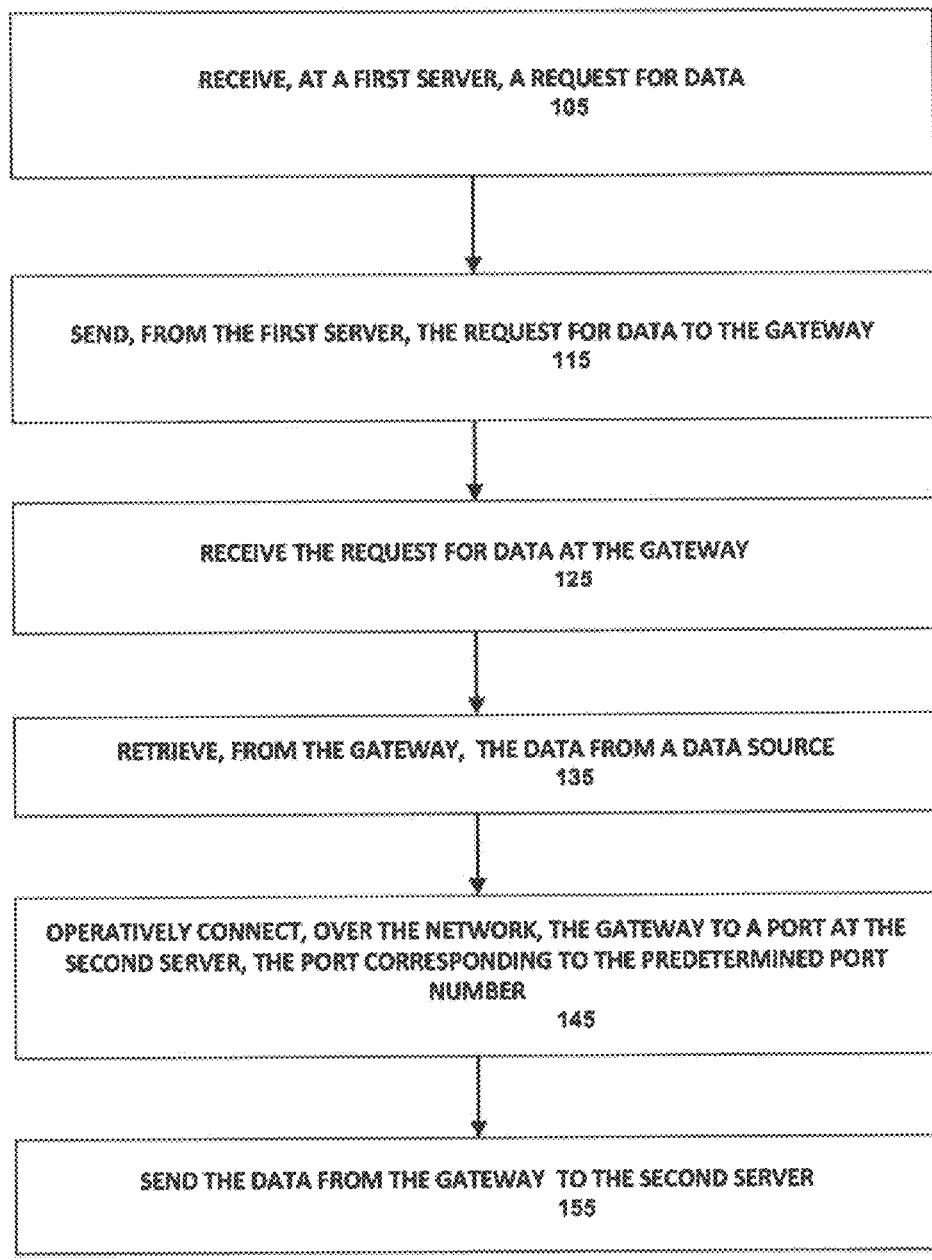
FIG. 5 is a schematic flow chart representation of one embodiment of the method of these teachings.

One embodiment of the method of these teachings is shown, in flowchart form, in FIG. 5. Referring to FIG. 5, in the embodiment shown there in, a first server receives a request for data (step 105, FIG. 5). The first server sends the request for data to the Gateway (step 115, FIG. 5) and a request for data is received at the Gateway (step 125, FIG. 5). The gateway retrieves the data from a data source (step 135, FIG. 5) and operatively connects over a network to a port at a second server, the port corresponding to a predetermined port number (step 145, FIG. 5). The Gateway then sends the data to the second server (step 155, FIG. 5).

In some instances, the request for data originated at a remote site, was sent from the remote side to the second server, and the second server, after receiving the data, sensor data to the remote site.

The method of these teachings, in one or more embodiments, can be described from a first server centric point of view, a second server centric point of view or a gateway center point of view.

Figure 6:
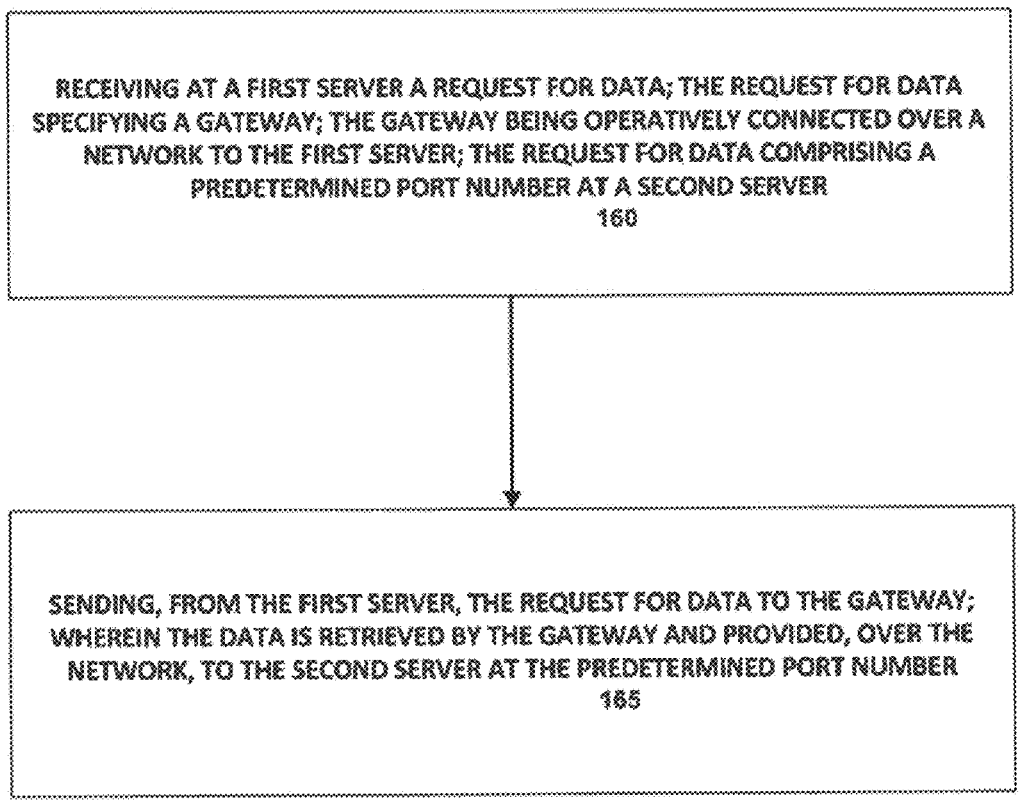
FIG. 6 is a schematic flow chart representation of a first server centric view of one embodiment of the method of these teachings.

In one or more embodiments, from a first server centric point of view, shown in FIG. 6, the method of these teachings includes receiving at a first server a request for data (step 160, FIG. 6), the request for data specifying a gateway, the gateway being operatively connected over a network to the first server, the request for data comprising a predetermined port number at a second server, and sending, from the first server, the request for data to the gateway (step 165, FIG. 6), wherein the data is retrieved by the gateway and provided, over the network, to the second server at the predetermined port number.

In one instance, from a first server centric point of view, the method of these teachings also includes providing to the gateway, from the first server, configuration data in order to modify or update configuration of the gateway. In another instance, from a first server centric point of view, the method of these teachings also includes providing to the gateway, from the first server, instructions to start or stop operations of a component.

In yet another instance, from a first server centric point of view, the method of these teachings also includes receiving, from the gateway, at the first server, component data characterizing a component operatively connected to the gateway, and obtaining, at the first server, a virtual representation of that component; the virtual representation comprising a virtual control interface; the virtual control interface enabling providing commands/instructions to the component. In that yet another instance, the method of these teachings can also include providing, from the first server, commands/instructions to the component operatively connected to the gateway.

Figure 7:
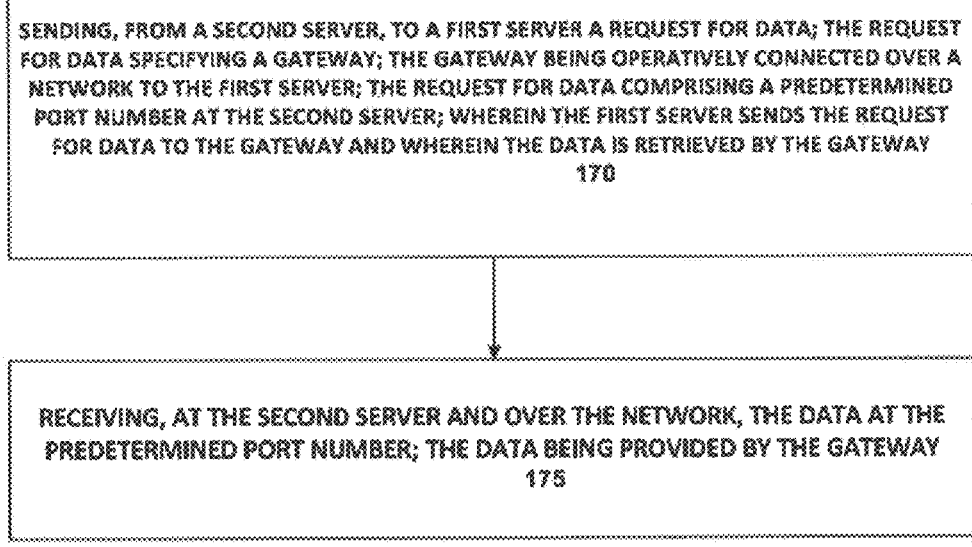
FIG. 7 is a schematic flow chart representation of a second server centric view of one embodiment of the method of these teachings.

In one or more embodiments, from a second server centric point of view, shown in FIG. 7, the method of these teachings includes sending, from a second server, to a first server, a request for data (step 170, FIG. 7), the request for data specifying a gateway, the gateway being operatively connected over a network to the first server, the request for data including a predetermined port number at the second server, wherein the first server sends the request for data to the gateway and wherein the data is retrieved by the gateway, and receiving, at the second server and over the network, the data at the predetermined port number (step 175, FIG. 7); the data being provided by the gateway.

In one instance, the second server includes a data rate measuring component and, from a second server centric point of view, the method of these teachings also includes sending, over the network, an initiation signal, from the second server to the gateway, in order to initiate a data rate measuring test to measure data rates between the second server and the gateway, wherein, after initiation of the data rate measuring test, test data is provided by the gateway to the second server, determining, using the data rate measuring component, a data rate between the second server and the gateway and providing, from the second server, the data rate to the gateway, wherein a data block size is calculated at the gateway in order to ensure substantially a predetermined data block rate. In an exemplary embodiment, the data block is a frame and the data block rate is a frame rate.

Figure 8:
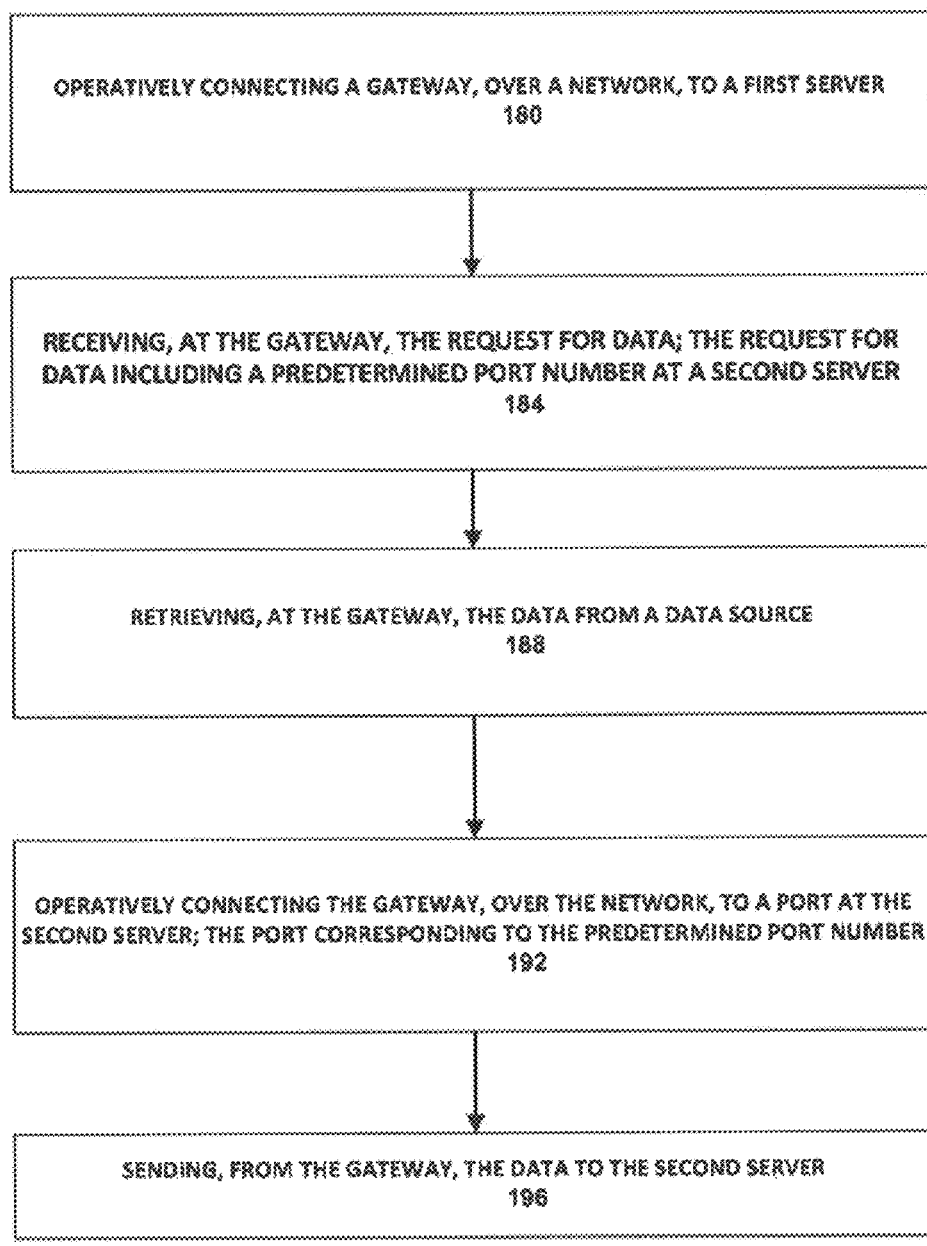
FIG. 8 is a schematic flow chart representation of a gateway centric view of one embodiment of the method of these teachings.

In one or more embodiments, from a gateway centric point of view, shown in FIG. 8, the method of these teachings includes operatively connecting a gateway, over a network, to a first server (step 180, FIG. 8), receiving, at the gateway, the request for data (step 184, FIG. 8), the request for data including a predetermined port number at a second server, retrieving, at the gateway, the data from a data source (step 188, FIG. 8), operatively connecting the gateway, over the network, to a port at the second server (step 192, FIG. 8); the port corresponding to the predetermined port number, and sending, from the gateway, the data to the second server (step 196, FIG. 8).

In one embodiment, the request for data originates at a remote site. In one instance, the remote site sends the request for data to the second server and the second server sends the request for data to the first server, in that embodiment, when the second server receives the data, the second server provides the data to the remote site.

In one instance, the second server includes a data rate measuring component and the method of these teachings, from a gateway centric point of view, also includes receiving, at the gateway and over the network, an initiation signal from the second server, in order to initiate a data rate measuring test to measure data rates between the second server, providing, from the gateway and after initiation of the data rate measuring test, test data to the second server, wherein a data rate between the second server and the gateway is determined using the data rate measuring component and provided, over the network, to the gateway, and calculating, at the gateway, a data block size in order to ensure substantially a predetermined data block rate.

In another instance, the method of these teachings, from a gateway centric point of view, also includes receiving, at the gateway, from the first server, configuration data in order to modify or update configuration of the gateway. In a further instance, the method of these teachings, from a gateway centric point of view, also includes receiving, at the gateway, from the first server, instructions to start or stop operations of a component.

In yet another instance, the method of these teachings, from a gateway centric point of view, also includes sending, from the gateway, at the first server, component data characterizing a component operatively connected to the gateway, wherein a virtual representation of that component is obtained at the first server, the virtual representation comprising a virtual control interface, the virtual control interface enabling providing commands/instructions to the component. In that yet another instance, the method of these teachings, from a gateway centric point of view, can also include receiving, at the gateway commands/instructions for the component operatively connected to the gateway.

In instances in which at least one of the first server and/or the second server and/or the gateway component is configured to perform the above described functions by having one or more processors execute computer readable code that is embodied in computer usable media, the present teachings also includes one or more computer program products including computer usable media that has the computer readable code embodied therein.

The description of the various components of a computing device is not intended to represent any particular architecture or manner of interconnecting the components. Other systems that have fewer or more components may also be used with the disclosed subject matter. A communication device may constitute a form of a computing device and may at least include a computing device. The computing device may include an inter-connect (e.g., bus and system core logic), which can interconnect such components of a computing device to a data processing device, such as a processor(s) or microprocessor(s), or other form of partly or completely programmable or pre-programmed device, e.g., hard wired and or application specific integrated circuit ("ASIC") customized logic circuitry, such as a controller or microcontroller, a digital signal processor, or any other form of device that can fetch instructions, operate on pre-loaded/pre-programmed instructions, and/or followed instructions found in hard-wired or customized circuitry to carry out logic operations that, together, perform steps of and whole processes and functionalities as described in the present disclosure.

In the above description, various functions, functionalities and/or operations may be described as being performed by or caused by software program code to simplify description. However, those skilled in the art will recognize what is meant by such expressions is that the functions result from execution of the program code/instructions by a computing device as described above, e.g., including a processor, such as a microprocessor, microcontroller, logic circuit or the like. Alternatively, or in combination, the functions and operations can be implemented using special purpose circuitry, with or without software instructions, such as using Application-Specific Integrated Circuit (ASIC) or Field- Programmable Gate Array (FPGA), which may be programmable, partly programmable or hard wired. The application specific integrated circuit ("ASIC") logic may be such as gate arrays or standard cells, or the like, implementing customized logic by metalization(s) interconnects of the base gate array ASIC architecture or selecting and providing metalization(s) interconnects between standard cell functional blocks included in a manufacturer's library of functional blocks, etc. Embodiments can thus be implemented using hardwired circuitry without program software code/instructions, or in combination with circuitry using programmed software code/instructions.

Thus, the techniques are limited neither to any specific combination of hardware circuitry and software, nor to any particular tangible source for the instructions executed by the data processor(s) within the computing device. While some embodiments can be implemented in fully functioning computers and computer systems, various embodiments are capable of being distributed as a computing device including, e.g., a variety of forms and capable of being applied regardless of the particular type of machine or tangible computer-readable media used to actually effect the performance of the functions and operations and/or the distribution of the performance of the functions, functionalities and/or operations.

The interconnect may connect the data processing device to define logic circuitry including memory. The interconnect may be internal to the data processing device, such as coupling a microprocessor to on-board cache memory or external (to the microprocessor) memory such as main memory, or a disk drive or external to the computing device, such as a remote memory, a disc farm or other mass storage device, etc. Commercially available microprocessors, one or more of which could be a computing device or part of a computing device, include a PA-RISC series microprocessor from Hewlett-Packard Company, an 80×86 or Pentium series microprocessor from Intel Corporation, a PowerPC microprocessor from IBM, a Spare microprocessor from Sun Microsystems, Inc, or a 68xxx series microprocessor from Motorola Corporation as examples.

The inter-connect in addition to interconnecting such as microprocessor(s) and memory may also interconnect such elements to a display controller and display device, and/or to other peripheral devices such as input/output (I/O) devices, e.g., through an input/output controller(s). Typical I/O devices can include a mouse, a keyboard(s), a modem(s), a network interface(s), printers, scanners, video cameras and other devices which are well known in the art. The inter-connect may include one or more buses connected to one another through various bridges, controllers and/or adapters. In one embodiment the I/O controller includes a USB (Universal Serial Bus) adapter for controlling USB peripherals, and/or an IEEE-1394 bus adapter for controlling IEEE-1394 peripherals.

The memory may include any tangible computer-readable media, which may include but are not limited to recordable and non-recordable type media such as volatile and non-volatile memory devices, such as volatile RAM (Random Access Memory), typically implemented as dynamic RAM (DRAM) which requires power continually in order to refresh or maintain the data in the memory, and non-volatile ROM (Read Only Memory), and other types of non-volatile memory, such as a hard drive, flash memory, detachable memory stick, etc. Non-volatile memory typically may include a magnetic hard drive, a magnetic optical drive, or an optical drive (e.g., a DVD RAM, a CD ROM, a DVD or a CD), or 'other type of memory system which maintains data even after power is removed from the system.

A server could be made up of one or more computing devices. Servers can be utilized, e.g., in a network to host a network database, compute necessary variables and information from information in the database(s), store and recover information from the database(s), track information and variables, provide interfaces for uploading and downloading information and variables, and/or sort or otherwise manipulate information and data from the database(s). In one embodiment a server can be used in conjunction with other computing devices positioned locally or remotely to perform certain calculations and other functions as may be mentioned in the present application.

At least some aspects of the disclosed subject matter can be embodied, at least in part, utilizing programmed software code/instructions. That is, the functions, functionalities and/or operations techniques may be carried out in a computing device or other data processing system in response to its processor, such as a microprocessor, executing sequences of instructions contained in a memory, such as ROM, volatile RAM, non-volatile memory, cache or a remote storage device. In general, the routines executed to implement the embodiments of the disclosed subject matter may be implemented as part of an operating system or a specific application, component, program, object, module or sequence of instructions usually referred to as "computer programs," or "software." The computer programs typically comprise instructions stored at various times in various tangible memory and storage devices in a computing device, such as in cache memory, main memory, internal or external disk drives, and other remote storage devices, such as a disc farm, and when read and executed by a processor(s) in the computing device, cause the computing device to perform a method(s), e.g., process and operation steps to execute an element(s) as part of some aspect(s) of the method(s) of the disclosed subject matter.

A tangible machine readable medium can be used to store software and data that, when executed by a computing device, causes the computing device to perform a method(s) as may be recited in one or more accompanying claims defining the disclosed subject matter. The tangible machine readable medium may include storage of the executable software program code/instructions and data in various tangible locations, including for example ROM, volatile RAM, non-volatile memory and/or cache. Portions of this program software code/instructions and/or data may be stored in any one of these storage devices. Further, the program software code/instructions can be obtained from remote storage, including, e.g., through centralized servers or peer to peer networks and the like. Different portions of the software program code/instructions and data can be obtained at different times and in different communication sessions or in a same communication session.

The software program code/instructions and data can be obtained in their entirety prior to the execution of a respective software application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a single machine readable medium in entirety at any particular instance of time.

In general, a tangible machine readable medium includes any tangible mechanism that provides (i.e., stores) information in a form accessible by a machine (i.e., a computing device, which may be included, e.g., in a communication device, a network device, a personal digital assistant, a mobile communication device, whether or not able to download and run applications from the communication network, such as the Internet, e.g., an I-phone, Blackberry, Droid or the like, a manufacturing tool, or any other device including a computing device, comprising one or more data processors, etc.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

What is claimed is:

1. A method for providing requested data, the method comprising: receiving at a first server a request for data; the request for data specifying a gateway; the gateway being operatively connected over a network to the first server; the request for data comprising a predetermined port number at a second server; the second server not being a router; the request for data originating at a remote system; the request for data provided by the remote system to the second server; the second server providing the request for data directly to the first server; the request for data being a request for data from data-producing devices; the data-producing devices comprising at least one component selected from a camera, a binary switch, a multi-level switch, a binary sensor, thermostat controls, an access control device, a siren, chimes, a voice output device, a stepper motor controller, or a PWM speed controller; receiving, from the gateway, at the first server, component data characterizing a component operatively connected to the gateway; and obtaining, at the first server, a virtual representation of said component; the virtual representation comprising a virtual control interface; the virtual control interface enabling providing commands/instructions to the component; providing, from the first server, commands/instructions to the component operatively connected to the gateway and sending, from the first server, the request for data to the gateway; the gateway being operatively connected over the network to the second server; the gateway also being directly connected to the data-producing devices; the data-producing devices being different from the first server and the second server; wherein the data is retrieved by the gateway and provided, over the network, to the second server at the predetermined port number; the second server providing data, over the network, to the remote system.

2. The method of claim 1 further comprising:
providing to the gateway, from the first server, configuration data in order to modify or update configuration of the gateway.

3. The method of claim 1 further comprising:
providing to the gateway, from the first server, instructions to start or stop operations of a component.

4. A method for providing requested data, the method comprising: sending, from a second server, to a first server a request for data; the second server not being a router; the request for data specifying a gateway; the request for data originating at a remote system; the request for data provided by the remote system to the second server; the second server providing the request for data directly to the first server; the request for data being a request for data from data-producing devices; the data-producing devices comprising at least one component selected from a camera, a binary switch, a multi-level switch, a binary sensor, thermostat controls, an access control device, a siren, chimes, a voice output device, a stepper motor controller, or a PWM speed controller; the gateway operatively connected over a network to the first server; the request for data comprising a predetermined port number at the second server; wherein the first server sends the request for data to the gateway and wherein the data is retrieved by the gateway; the gateway being operatively connected over the network to the second server; the gateway also being directly connected to the data-producing devices; and receiving at the second server and over the network, the data at the predetermined port number; the data being provided by the gateway; the second server providing the data, over the network, to the remote system; wherein the first server receives, from the gateway, component data characterizing a component operatively connected to the gateway; and wherein the first server obtains a virtual representation of said component; the virtual representation comprising a virtual control interface; the virtual control interface enabling providing commands/instructions to the component; and providing, from the first server, commands/instructions to the component operatively connected to the gateway.

5. A method for providing requested data, the method comprising: sending, from a second server, to a first server a request for data; the second server not being a router; the request for data specifying a gateway; the request for data originating at a remote system; the request for data provided by the remote system to the second server; the second server providing the request for data directly to the first server; the request for data being a request for data from data-producing devices; the data-producing devices comprising at least one component selected from a camera, a binary switch, a multi-level switch, a binary sensor, thermostat controls, an access control device, a siren, chimes, a voice output device, a stepper motor controller, or a PWM speed controller; the gateway operatively connected over a network to the first server; the request for data comprising a predetermined port number at the second server; wherein the first server sends the request for data to the gateway and wherein the data is retrieved by the gateway; the gateway being operatively connected over the network to the second server; the gateway also being directly connected to the data-producing devices; and receiving at the second server and over the network, the data at the predetermined port number; the data being provided by the gateway; the second server providing the data, over the network, to the remote system; wherein the first server receives, from the gateway, component data characterizing a component operatively connected to the gateway; and wherein the first server obtains a virtual representation of said component; the virtual representation comprising a virtual control interface; the virtual control interface enabling providing commands/instructions to the component; wherein the second server comprises a datarate-measuring component; and wherein the method further comprises: sending, over the network, an initiation signal, from the second server to the gateway, in order to initiate a data-rate-measuring test to measure data rates between the second server and the gateway; wherein, after initiation of the data-rate-measuring test, test data is provided by the gateway to the second server; determining, using the data-rate-measuring component, a data rate between the second server and the gateway; and providing, from the second server, the data rate to the gateway; wherein a data block size is calculated at the gateway in order to ensure a substantially predetermined block rate.

6. A method for providing requested data, the method comprising: operatively connecting a gateway, over a network, to a first server; receiving, at the gateway, a request for data from the first server; the request for data comprising a predetermined port number at a second server; the second server not being a router; the request for data originating at a remote system; the request for data provided by the remote system to the second server; the second server providing the request for data directly to the first server; the request for data being a request for data from a data source; the data source comprising at least one component selected from a camera, a binary switch, a multi-level switch, a binary sensor, thermostat controls, an access control device, a siren, chimes, a voice output device, a stepper motor controller, or a PWM speed controller; retrieving, at the gateway, the data from the data source; the gateway being directly connected to the data source; the data source being different from the first server and the second server; operatively connecting the gateway, over the network, to a port at the second server; the port corresponding to the predetermined port number; and sending, from the gateway, the data to the second server; wherein the second server provides the data, over the network, to the remote system; sending, from the gateway, to the first server, component data characterizing a component operatively connected to the gateway; wherein the first server obtains a virtual representation of said component; the virtual representation comprising a virtual control interface; the virtual control interface enabling providing commands/instructions to the component; and receiving, at the gateway, commands/instructions to the component operatively connected to the gateway.

7. The method of claim 6 further comprising:
receiving, at the gateway, from the first server, configuration data in order to modify or update configuration of the gateway.

8. The method of claim 6 further comprising:
receiving, at the gateway, from the first server, instructions to start or stop operations of a component.

9. A method for providing requested data, the method comprising: operatively connecting a gateway, over a network, to a first server; receiving, at the gateway, a request for data from the first server; the request for data comprising a predetermined port number at a second server; the second server not being a router; the request for data originating at a remote system; the request for data provided by the remote system to the second server; the second server providing the request for data directly to the first server; the request for data being a request for data from a data source; the data source comprising at least one component selected from a camera, a binary switch, a multi-level switch, a binary sensor, thermostat controls, an access control device, a siren, chimes, a voice output device, a stepper motor controller, or a PWM speed controller; retrieving, at the gateway, the data from the data source; the gateway being directly connected to the data source; the data source being different from the first server and the second server; operatively connecting the gateway, over the network, to a port at the second server; the port corresponding to the predetermined port number; and sending, from the gateway, the data to the second server wherein the second server provides the data, over the network, to the remote system; sending, from the gateway, to the first server, component data characterizing a component operatively connected to the gateway; wherein the first server obtains a virtual representation of said component; the virtual representation comprising a virtual control interface; the virtual control interface enabling providing commands/instructions to the component; wherein the second server comprises a data-rate-measuring component; and wherein the method further comprises: receiving, at the gateway and over the network, an initiation signal from the second server, in order to initiate a data-rate-measuring test to measure data rates between the second server and the gateway; providing, from the gateway and after initiation of the data-rate-measuring test, test data to the second server; wherein a data rate between the second server and the gateway is determined using the data-rate-measuring component and provided, over the network, to the gateway; and calculating, at the gateway, a data block size in order to ensure a substantially predetermined data block rate.

10. A system comprising: a first server; a second server operatively connected over a network to the first server; the second server not being a router; and a gateway component operatively connected over the network to the first server and the second server; the first server being configured to: receive a request for data directly from the second server; the request for data specifying the gateway component; the request for data comprising a predetermined port number at the second server; the request for data originating at a remote system; the request for data provided over the network by the remote system to the second server; the request for data being a request for data from a data source; the data source comprising at least one component selected from a camera, a binary switch, a multi-level switch, a binary sensor, thermostat controls, an access control device, a siren, chimes, a voice output device, a stepper motor controller, or a PWM speed controller; wherein the first server is further configured to: receive, from the gateway component, component data characterizing a component operatively connected to the gateway component; and obtain a virtual representation of said component; the virtual representation comprising a virtual control interface; the virtual control interface enabling providing commands/instructions to the component; provide commands/instructions to the component operatively connected to the gateway component; and send the request for data to the gateway component; the second server being configured to: receive the data at the predetermined port number; the data being provided over the network by the gateway component; and the gateway component being configured to: receive the request for data; retrieve the data from the data source; the data source directly connected to the gateway component; the data source being different from the first server and the second server; operatively connect, over the network, to a port at the second server; the port corresponding to the predetermined port number; send, to the first server, component data characterizing a component operatively connected to the gateway component; and send the data to the second server.

11. The system of claim 10 wherein the second server is also configured to send to the first server the request for data.

12. The system of claim 11 wherein the second server is also configured to:
receive the request for data from a remote site; and
send, after receiving the data, the data to the remote site.

13. The system of claim 10 wherein the first server is also configured to:
provide, to the gateway component, configuration data in order to modify or update configuration of the gateway component.

14. The system of claim 10 wherein the first server is also configured to:
provide, to the gateway, instructions to start or stop operations of a component.

15. The system of claim 10 wherein the first server comprises: at least one first processor; and first computer-usable media; said first computer-usable media and said at least one first processor being operatively connected; wherein the second server comprises: at least one second processor; and second computer-usable media; said second computer-usable media and said at least one second processor being operatively connected; said first computer-usable media having first computer-readable code embodied therein, the first computer-readable code causing the at least one first processor to: receive a request for data; the request for data specifying the gateway component; the request for data comprising a predetermined port number at the second server; and send the request for data to the gateway component; said second computer-usable media having second computer-readable code embodied therein, the second computer-readable code causing the at least one second processor to: receive the data at the predetermined port number; the data being provided by the gateway component.

16. The system of claim 15 wherein the gateway component comprises: at least one third processor; and third computer-usable media having third computer-readable code embodied therein, the third computer-readable code causing the at least one third processor to: receive the request for data; retrieve the data from a data source; operatively connect, over the network, to a port at the second server; the port corresponding to the predetermined port number; and send the data to the second server; said third computer-usable media and said at least one third processor being operatively connected.

17. A system comprising: a first server; a second server operatively connected over a network to the first server; the second server not being a router; and a gateway component operatively connected over the network to the first server and the second server; the first server being configured to: receive a request for data directly from the second server; the request for data specifying the gateway component; the request for data comprising a predetermined port number at the second server; the request for data originating at a remote system; the request for data provided over the network by the remote system to the second server; the request for data being a request for data from a data source; the data source comprising at least one component selected from a camera, a binary switch, a multi-level switch, a binary sensor, thermostat controls, an access control device, a siren, chimes, a voice output device, a stepper motor controller, or a PWM speed controller; receive, from the gateway component, component data characterizing a component operatively connected to the gateway component; and obtain a virtual representation of said component; the virtual representation comprising a virtual control interface; the virtual control interface enabling providing commands/instructions to the component; and send the request for data to the gateway component; the second server being configured to: receive the data at the predetermined port number; the data being provided over the network by the gateway component; and the gateway component being configured to: receive the request for data; retrieve the data from the data source; the data source directly connected to the gateway component; the data source being different from the first server and the second server; operatively connect, over the network, to a port at the second server; the port corresponding to the predetermined port number; send, to the first server, component data characterizing a component operatively connected to the gateway component; and send the data to the second server; wherein the second server comprises a data-rate-measuring subsystem; wherein the second server is also configured to: send, over the network, an initiation signal to the gateway component in order to initiate a data-rate-measuring test to measure data rates between the second server and the gateway component; wherein the gateway component is also configured to, after initiation of the data-rate-measuring test, provide test data to the second server; and wherein the second server is further configured to: determine, using the data-rate-measuring subsystem, a data rate between the second server and the gateway component; and provide the data rate to the gateway component; and wherein the gateway component is further configured to calculate a data block size in order to ensure a substantially predetermined data block rate.

18. A computer program product comprising: non-transitory computer-usable media having computer-readable code embodied therein, the computer-readable code causing at least one processor to: receive at a first server a request for data; the request for data specifying a gateway; the request for data originating at a remote system; the request for data provided by the remote system to a second server; the second server not being a router; the request for data being a request for data from data-producing devices; the data-producing devices comprising at least one component selected from a camera, a binary switch, a multi-level switch, a binary sensor, thermostat controls, an access control device, a siren, chimes, a voice output device, a stepper motor controller, or a PWM speed controller; the second server providing the request for data directly to the first server; the gateway being operatively connected over a network to the first server; the gateway also being operatively connected over the network to the second server; the gateway also being directly connected to the data-producing devices; the data-producing devices being different from the first server and the second server; the request for data comprising a predetermined port number at the second server; receive, at the first server from the gateway, component data characterizing a component operatively connected to the gateway; and obtain, by the first server, a virtual representation of said component; the virtual representation comprising a virtual control interface; the virtual control interface enabling providing commands/instructions to the component; providing, from the first server, commands/instructions to the component operatively connected to the gateway; and send, from the first server, the request for data to the gateway; wherein the data is retrieved by the gateway and provided, over the network, to the second server at the predetermined port number; the second server providing the data, over the network, to the remote system.

19. A computer program product comprising: non-transitory computer-usable media having computer-readable code embodied therein, the computer-readable code causing at least one processor to: send, from a second server, to a first server a request for data; the request for data specifying a gateway; the request originating at a remote system; the request for data provided by the remote system to the second server; the second server not being a router; the request for data being a request for data from data-producing devices; the data-producing devices comprising at least one component selected from a camera, a binary switch, a multi-level switch, a binary sensor, thermostat controls, an access control device, a siren, chimes, a voice output device, a stepper motor controller, or a PWM speed controller; the second server providing the request for data directly to the first server; the gateway being operatively connected over a network to the first server; the gateway also being operatively connected over the network to the second server; the gateway also being directly connected to the data-producing devices; the data-producing devices being different from the first server and the second server; the request for data comprising a predetermined port number in the second server; wherein the first server sends the request for data to the gateway and wherein the data is retrieved by the gateway; and receive, at the second server and over the network, the data at the predetermined port number; the data being provided by the gateway; the second server providing the data, over the network, to the remote system; wherein the first server receives, from the gateway, component data characterizing a component operatively connected to the gateway; and wherein the first server obtains a virtual representation of said component; the virtual representation comprising a virtual control interface; the virtual control interface enabling providing commands/instructions to the component; wherein the first server provides commands/instructions to the component operatively connected to the gateway.

20. A computer program product comprising: non-transitory computer-usable media having computer-readable code embodied therein, the computer-readable code causing at least one processor to: operatively connect a gateway, over a network, to a first server; receive, at the gateway, a request for data; the request for data comprising a predetermined port number at a second server; the second server not being a router; the request for data originating at a remote system; the request for data provided by the remote system to the second server; the second server providing the request for data directly to the first server; the request for data being a request for data from a data source; the data source comprising at least one component selected from a camera, a binary switch, a multi-level switch, a binary sensor, thermostat controls, an access control device, a siren, chimes, a voice output device, a stepper motor controller, or a PWM speed controller; retrieve, at the gateway, the data from the data source; the at least one data source being different from the first server and the second server; operatively connect the gateway, over the network, to a port at the second server; the port corresponding to a predetermined port number; send, to the first server, component data characterizing a component operatively connected to the gateway; and send from the gateway, the data to the second server; wherein the first server obtains a virtual representation of said component; the virtual representation comprises a virtual control interface; the virtual control interface enabling providing commands/instructions to the component; and wherein the gateway receives commands/instructions for the component operatively connected to the gateway.

* * * * *